(12) United States Patent
Wallen et al.

(10) Patent No.: US 7,822,399 B2
(45) Date of Patent: Oct. 26, 2010

(54) IMAGE COMPENSATION FOR WIRELESS RECEIVER

(75) Inventors: Anders Wallen, Eslöv (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 481 days.

(21) Appl. No.: 11/747,284

(22) Filed: May 11, 2007

(65) Prior Publication Data

US 2008/0280580 A1    Nov. 13, 2008

(51) Int. Cl.
H04B 1/10    (2006.01)
H04K 3/00    (2006.01)

(52) U.S. Cl. .................. 455/285; 455/302

(58) Field of Classification Search ............ 455/285, 455/295–296, 302; 370/208, 344; 375/346
See application file for complete search history.

(56) References Cited

U.S. PATENT DOCUMENTS

| | | | |
|---|---|---|---|
| 6,414,980 B1 | 7/2002 | Wang et al. | |
| 6,442,217 B1 | 8/2002 | Cochran | |
| 6,999,501 B1 | 2/2006 | Sawyer | |
| 7,010,278 B2 | 3/2006 | Kirschenmann et al. | |
| 7,035,341 B2 | 4/2006 | Mohindra | |
| 7,076,008 B2 | 7/2006 | Jeong | |
| 7,130,359 B2 | 10/2006 | Rahman | |
| 7,133,657 B2 | 11/2006 | Kuenen et al. | |
| 7,173,988 B2 | 2/2007 | Cochran et al. | |
| 7,177,372 B2 | 2/2007 | Gu | |
| 7,184,714 B1 | 2/2007 | Kutagulla et al. | |
| 7,190,733 B2 | 3/2007 | Sugar | |
| 7,242,730 B2 | 7/2007 | Kasperkovitz | |
| 2003/0007574 A1 | 1/2003 | Li et al. | |
| 2003/0072393 A1 | 4/2003 | Gu | |
| 2003/0165203 A1 | 9/2003 | Mohindra | |
| 2004/0095993 A1 | 5/2004 | Liu et al. | |

(Continued)

FOREIGN PATENT DOCUMENTS

EP    1 416 691    3/2006

OTHER PUBLICATIONS

International Search Report and Written Opinion mailed Oct. 16, 2008 in corresponding PCT application PCT/SE2008/050192.

(Continued)

Primary Examiner—Lee Nguyen
(74) Attorney, Agent, or Firm—Nixon & Vanderhye, P.C.

(57) ABSTRACT

A receiver (20) for use in wireless communications with plural transmitters (22) comprises transmitter selection logic (34); a signal estimator (36); and an image estimator (38). The image estimator (38) is configured to form an estimate of an image signal occurring on the second sub-carrier and attributable to a transmission of the first transmitter. The signal estimator (36) is configured, e.g., to use the estimate of the image signal and a signal received on the second sub-carrier to obtain an estimate of a portion of the signal received on the second sub-carrier which is attributable to the second transmitter. Thus, the receiver (20) is able to determine the portion of the signal received on the second sub-carrier which is attributable to the second transmitter in a way that compensates for the image signal occurring at the second sub-carrier.

20 Claims, 9 Drawing Sheets

U.S. PATENT DOCUMENTS

| | | |
|---|---|---|
| 2004/0165678 A1 | 8/2004 | Nakiri |
| 2005/0070236 A1 | 3/2005 | Paulus |
| 2005/0152476 A1 | 7/2005 | Coersmeier |
| 2005/0243218 A1 | 11/2005 | Yee et al. |
| 2005/0249266 A1 | 11/2005 | Brown et al. |
| 2006/0034218 A1 | 2/2006 | Ozluturk et al. |
| 2006/0153318 A1 | 7/2006 | Sugar |
| 2006/0229051 A1 | 10/2006 | Narayan et al. |
| 2006/0252399 A1 | 11/2006 | Paulus |
| 2006/0256216 A1 | 11/2006 | Takahiko et al. |
| 2006/0270375 A1 | 11/2006 | Bearmish et al. |
| 2006/0281411 A1 | 12/2006 | Isaac et al. |
| 2007/0081614 A1 | 4/2007 | Su |
| 2007/0097271 A1 | 5/2007 | Gao et al. |
| 2007/0116149 A1 | 5/2007 | Sugar |
| 2009/0034666 A1* | 2/2009 | Lindoff et al. ............ 375/349 |
| 2009/0036079 A1 | 2/2009 | Lindoff et al. |

OTHER PUBLICATIONS

Defeng et al, "An Interference-Cancellation Scheme for Carrier-Frequency Offsets Correction in OFDMA Systems", IEEE Transactions on Communications, vol. 53, No. 1, Jan. 2005, pp. 203-204.

Arslan et al, "Successive Cancellation of Adjacent Channel Signals in FDMA/TDMA Digital Mobile Radio Systems", Vehicular Technology Conference, 1998, VTC 98, $48^{th}$ IEEE, May 18-21, 1998, vol. 3, pp. 1720-1724.

Marabissi et al, "Robust Multiuser Interference Cancellation for OFDM Systems With Frequency Offset", IEEE Transactions on Wireless Communications, vol. 5, No. 11, Nov. 2006, pp. 3068-3076.

Anttila et al, "Radio Reception with SC-FDMA Waveforms Under I/Q Imbalance", IEEE International Symposium on Circuits and Systems, 2007, ISCAS 2007, May 27-30, 2007, pp. 25-28.

Simoens et al, "New I/! Imbalance Modeling and Compensation in OFDM Systems with Frequency Offset", The $13^{th}$ International Symposium on Personal, Indoor and Mobile Radio Communications 2002, Sep. 15-18, 2002, vol. 2, pp. 561-566.

Li Yu et al, "A Novel Adaptive Mismatch Cancellation System for Quadrature IF Radio Receivers", IEEE Transaction on Circuits and Systems II: Express Briefs, IEEE Service Center, New York, NY, US, vol. 46, No. 6, Jun. 1, 1999.

Valkama et al, "A Novel Image Rejection Architecture for Quadrature Radio Receivers", IEEE Transactions on Circuits and Systems II: Express Briefs, Feb. 2004, vol. 52, No. 2, pp. 61-68.

Cao et al, "Panametric Modeling in Mitigating the I/Q Mismatch: Estimation, Equalization and Performance Analysis", Annual Conference on Information Sciences and Systems, Mar. 2006, pp. 1286-1290.

Lohtia et al, "An Adaptive Digital technique for Compensating for Analog Quadrature Modulator/Demodulator Impairments", IEEE Pacific Rim Conference on Communications, Computers and Signal Processing, May 1993, vol. 2., pp. 447-450.

Zhu et al, "Bias Analysis of a Gain/Phase/DC-Offset Estimation Technique for Direct Frequency Conversion Modulators", IEEE International Conference on Acoustics, Speech, and Signal Processing, Mar. 2005, vol. 3, pp. iii/825-iii/828.

Yu et al, "A Novel Technique for I/Q Imbalance and CFO Compensation in OFDM Systems", IEEE International Symposium on Circuits and Systems, May 2005, vol. 6, pp. 6030-6033.

Yamaoka et al, "A Novel Error Separation Technique for Quadrature Modulators and Demodulators", IEEE Radio and Wireless Symposium, Jan. 2007, pp. 563-566.

Xing et al, "Frequency Offset and I/Q Imbalance Compensation for Direct-Conversion Receivers", IEEE Transactions on Wireless Communications, Mar. 2005, vol. 4, No. 2, pp. 673-680.

Yan et al, "Carrier Frequency Offset Estimation for OFDM Systems with I/Q Imbalance", The $47^{th}$ IEEE International Midwest Symposium on Circuits and Systems, Jul. 25-28, 2004, vol. 2, pp. II-633-II-636.

Tubbax et al, "Joint Compensation of IQ Imbalance and Frequency Offset in OFDM Systems", Proceedings of Radio and Wireless Conference 2003 (RAWCON '03), Aug. 10-13, 2003, pp. 39-42.

* cited by examiner

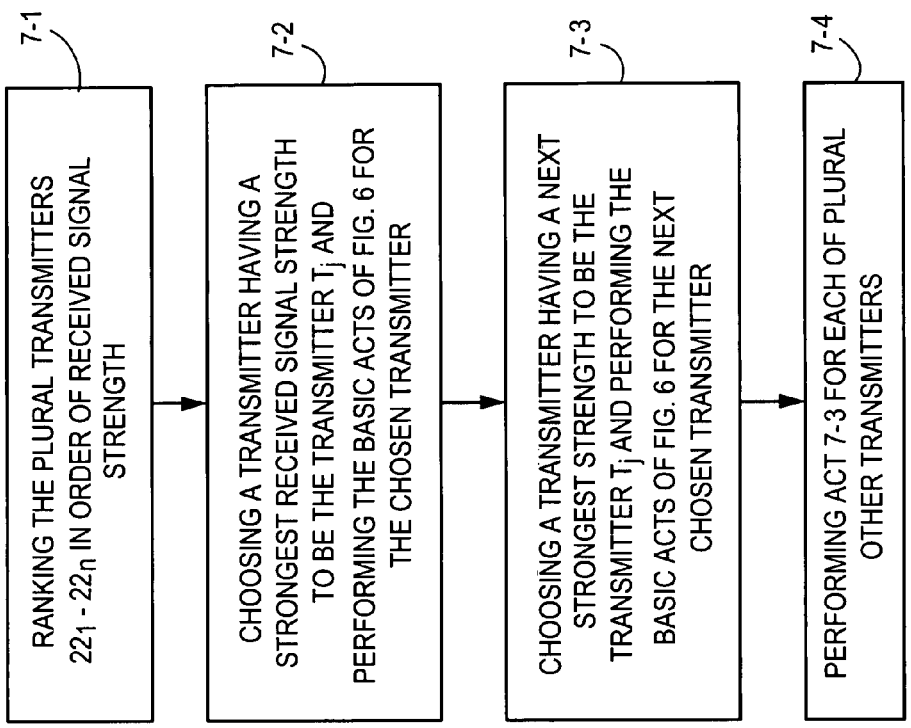
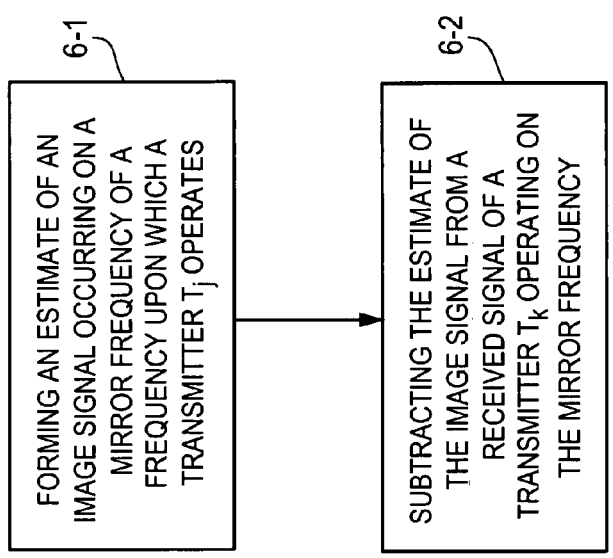
Fig. 7
Fig. 6

IMAGE COMPENSATION FOR WIRELESS RECEIVER

BACKGROUND

I. Technical Field

This invention pertains to wireless telecommunications, and particular to structure and operation of a wireless receiver.

II. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

In the forthcoming evolution of the mobile cellular standards (like GSM and WCDMA) new modulation techniques (like Orthogonal-Frequency-Division Multiplexing (OFDM)) are likely to occur. Furthermore, in order to have a smooth migration of the "old" cellular systems to the new high capacity high data rate system in the existing radio spectrum, the new system has to be able to operate on a flexible bandwidth. A proposal for such a new flexible cellular system is 3G Long Term Evolution (3G LTE). 3G LTE can be seen as an evolution of the 3G WCDMA standard. That system will use OFDM as a multiple access technique (called OFDMA) in the downlink, but the current assumption is that SC-FDMA (Singe-carrier Frequency Division Multiple Access) will be used in the uplink (UL).

As the current LTE concept stands, the available bandwidth in the SC-FDMA uplink is divided into resource units (RUs) of 180 kHz each. The total occupied bandwidth (BW) of the system varies between 1.25 MHz up to 20 MHz, and the number of RUs varies accordingly. Each user equipment unit (UE), which can be, e.g., mobile station, mobile terminal, wireless station, is allocated an integer number of consecutive RUs, located somewhere in the frequency band. Which RUs, and how many RUs are allocated to each UE is decided by a scheduler in a base station (e.g., in a NodeB), and depends, e.g., on propagation channel conditions and the amount of data to be transmitted. This is thus dynamic, and can change very rapidly.

A SC-FDMA (Singe-carrier Frequency Division Multiple Access) system, similar to a OFDMA system, has a useful property that the frequencies allocated to different users are orthogonal to each other, and can thus be separated without interfering each other. In practice, however, there are several factors that can destroy the orthogonality, leading to inter-frequency interference. One such factor is the spectral impurity that is inevitable in any practical radio transmitter. For example, an image problem can be caused by gain and phase quadrature imbalance, henceforth denoted IQ imbalance, in the transceiver.

IQ imbalance is illustrated in FIG. 1, which depicts an emitted spectrum from a UE transmitting on the 20 "leftmost" resource units (RUs) in a 20 MHz system, occupying frequencies from −9 to −5.4 MHz, where 0 MHz indicates the center of the 20 MHz carrier. Due to imperfections in the (analog) circuitry, an image of the desired signal will be transmitted, on frequencies from 5.4 MHz to 9 MHz in FIG. 1. What frequencies the image is transmitted on depends on where the frequency of the local oscillator is located. In FIG. 1 it is assumed that the local oscillator is located at the center of the band, i.e. at 0 MHz. If the local oscillator would instead been located in the middle of the desired signal, i.e. at −7.2 MHz, the image would have landed onto the desired signal itself, and would not have been visible in the spectrum plot.

Different techniques for suppressing the size of the image can be applied to the transmitter. However, since the IQ imbalance varies with individual components, it is difficult to guarantee extensive image rejection for every single UE.

Since the image generated by a transmitter such as a UE is not projected onto the frequencies allocated to the UE by a scheduler of a base station node (e.g., NodeB), the reception in the NodeB of the signal on the allocated frequency will not be compromised. However, the UE having the signal shown in FIG. 1 will cause interference for UEs transmitting at the image frequencies. If the UEs transmitting on those image frequencies are received at much lower power in the NodeB, the image from the first UE will indeed cause a severe signal to noise ratio (SNR) degradation at the NodeB receiver for these UEs, as is illustrated in FIG. 2. FIG. 2 shows by line UE 1 the received signal of a stronger of two transmitters, and by line UE 2 the received signal of the weaker of the two transmitters, the weaker transmitter operating at a mirror frequency of the operating frequency of the stronger transmitter. As shown in FIG. 2, there is a severe signal to noise ratio (SNR) degradation at the NodeB receiver for the signal received from the weaker transmitter (UE 2).

The effect illustrated by FIG. 2 may be mitigated by the use of UL power control (open or closed loop) by aiming at making the signals from the different UEs being received at the NodeB with equal power. However, such power control will never be perfect due to phenomena and occurrences such as fast fading, measurement and signaling errors, terminals already transmitting at maximum or minimum power etc. Thus, there will always be situations where the received power from different UEs varies significantly.

The problem is similar for an OFDMA system. Moreover, in an OFDMA system, instead of having only one "high"

spectrum allocation (desired signal) as in FIG. 1 and one "low" spectrum allocation (image), it is also possible to have several high peaks and several lower images.

There are different techniques which attempt, at least in part, to address the image protection problem.

A first technique involves fast closed-loop power control. If the power control loop is sufficiently fast, the difference in received power between different UEs can be made smaller by following the fast fading. However, the power control will still not be perfect, for reasons mentioned above. Therefore, this first technique is not a sufficient solution to the problem.

A second technique requires improved image rejection at the transmitter. However, very high image rejection on each individual UE may require extensive trimming, which is time consuming and costly. Adaptive solutions are possible, but are difficult since it requires suppression of a weak signal within a large one, and also since the causes of the IQ imbalance appear relatively late in the transmission (TX) chain.

A third technique involves fast change of local oscillator frequency. If the local oscillator is always located in the middle of the desired transmitted signal, the image will be projected onto the desired signal. Image projection on a given signal can be avoided by changing the local oscillator frequency. However, there are several implementation issues with changing the local oscillator frequency. One issue concerns the fact of the if resource unit (RU) allocation switches rapidly, the local oscillator needs to adjust to the new frequency within fractions of the cyclic prefix. This means less than 1 µs, which is orders of magnitude from what is currently feasible in a low-cost radio.

A fourth technique involves interference-aware resource allocation. It is possible for the NodeB to schedule users in the frequency domain to match the induced disturbance with the received powers and the required SNR for different UEs. This option may however not always be feasible or desirable.

What is needed, therefore, and an object of the present invention, are better apparatus, methods, and techniques for compensating for an image signal at a wireless receiver.

SUMMARY

A receiver for use in wireless communications with plural transmitters comprises transmitter selection logic; a signal estimator; and an image estimator. The transmitter selection logic is configured to choose which of the plural transmitters is to be considered for current signal processing purposes as a first transmitter for transmitting to the receiver on a first sub-carrier set. The mirror frequencies of the first sub-carrier set, if also utilized as sub-carriers, are then considered to be a second sub-carrier set. Any one of the plural transmitters which transmits to the receiver on the second sub-carrier set can be considered as a second transmitter, with the transmitter selecting logic choosing one or more of the possible plural transmitters that transmits on the second sub-carrier set to be selected as a second transmitter for current signal processing purposes.

The image estimator is configured to form an estimate of an image signal occurring on the second sub-carrier set and attributable to a transmission of the first transmitter. The signal estimator is configured, e.g., to use the estimate of the image signal and a signal received on the second sub-carrier set to obtain an estimate of a portion of the signal received on the second sub-carrier set which is attributable to the second transmitter. Thus, the receiver is able to determine the portion of the signal received on one sub-carrier in the second sub-carrier set which is attributable to the second transmitter in a way that compensates for the image signal from the first transmitter occurring at that specific second sub-carrier.

In an example embodiment, the transmitter selection logic is configured to make a ranking of the plural transmitters in order of received signal strength. Further, in accordance with the ranking, the transmitter selection logic chooses which of the plural transmitters is to be considered as the first transmitter for, e.g., performing a method of signal estimation that compensates for the image signal. After having considered one of the plural transmitters as the first transmitter, the transmitter selection logic is further configured to iteratively choose (in accordance with, e.g., the ranking) others of the plural transmitters to be the first transmitter, and then to perform the signal estimation method in case any other strong transmitters contribute to or provide an image signal on the second sub-carrier set.

In an example implementation, the signal estimator comprises a multiplier configured to multiply a factor $\hat{a}_i$ representing an estimate of the image rejection in the first transmitter (i.e., image rejection factor) by a conjugate transpose of a signal received on the first sub-carrier to form the estimate of the image signal. In another example implementation, the multiplier comprising the image estimator is configured to multiply the image rejection factor $\hat{a}_i$ by a conjugate transpose of an estimate of the signal received on the first sub-carrier to form the estimate of the image signal (the estimate of the signal received on the first sub-carrier being derived from a re-encoded version of the signal received from the first transmitter). In a variation of either implementation, the image estimator 38 is configured to dynamically select between using either (1) the signal received on the first sub-carrier or (2) an estimate of the signal received on the first sub-carrier for forming the estimate of the image signal.

In an example embodiment, the image estimator is configured to generate the estimate of the image rejection factor $\hat{a}_i$ by evaluating $$\hat{a}_i = \frac{1}{b+1} \sum_{i=a}^{a+b} \frac{1}{|\hat{h}_i|^2} \hat{Y}_i Y_{-i},$$

wherein a and b define a sub-carrier set [a, a+b] transmitted from the first transmitter and including the sub-carrier i; wherein $\hat{Y}_i$ is either (1) the signal received on the first sub-carrier or (2) an estimate of the signal received on the first sub-carrier; wherein $\hat{h}_i$ is an estimate of the radio channel for the first sub-carrier; and wherein $Y_{-i}$ is the signal received on the second sub-carrier.

In an example embodiment, the signal estimator is configured to subtract the estimate of the image signal from the signal received on the second sub-carrier to obtain the estimate of the portion of the signal received on the second sub-carrier which is attributable to the second transmitter.

In another of its aspects the technology concerns a method of operating a receiver which receives radio frequency signals from plural transmitters. The method comprises the basic example acts of (a) forming an estimate of an image signal occurring on a mirror frequency of a frequency upon which a transmitter $T_j$ operates; and (b) subtracting the estimate of the image signal from a received signal of a transmitter $T_k$ operating on the mirror frequency.

In an example mode, the method further comprises the example acts of (1) ranking the plural transmitters in order of received signal strength; (2) choosing a transmitter having a strongest received signal strength to be the transmitter T and performing the basic acts of the method for the chosen transmitter; then (3) choosing a transmitter having a next strongest strength to be the transmitter T and performing the basic acts of the method for the next chosen transmitter; and (4) performing act (3) for each of plural other transmitters.

The transmitter $T_j$ is considered the stronger of two transmitters, the transmitter $T_k$ is considered the weaker of two the two transmitters. In one example implementation, the basic acts of the method are performed for the transmitter $T_k$ only if the received signal strength of the transmitter $T_j$ exceeds the received signal strength of the transmitter $T_k$ by a predetermined amount. For example, the predetermined amount can be about 10 dB, depending on design parameters.

In an example implementation, the basic acts of the method are performed for each frame unit received by the receiver. A frame unit comprises received signals from each of the plural transmitters.

In an example implementation, the estimate of the image signal occurring on the mirror frequency is formed by evaluating the expression $\hat{a}_i \hat{Y}_i^*$, wherein $\hat{Y}_i^*$ is a conjugate transpose of an estimate of the signal received on the first sub-carrier.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6 is a flowchart showing example acts comprising a basic aspect of a method of image compensation of a receiver.

FIG. 7 is a flowchart showing further example acts involved in an example mode of implementing the method of FIG. 6.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

Figure 3:
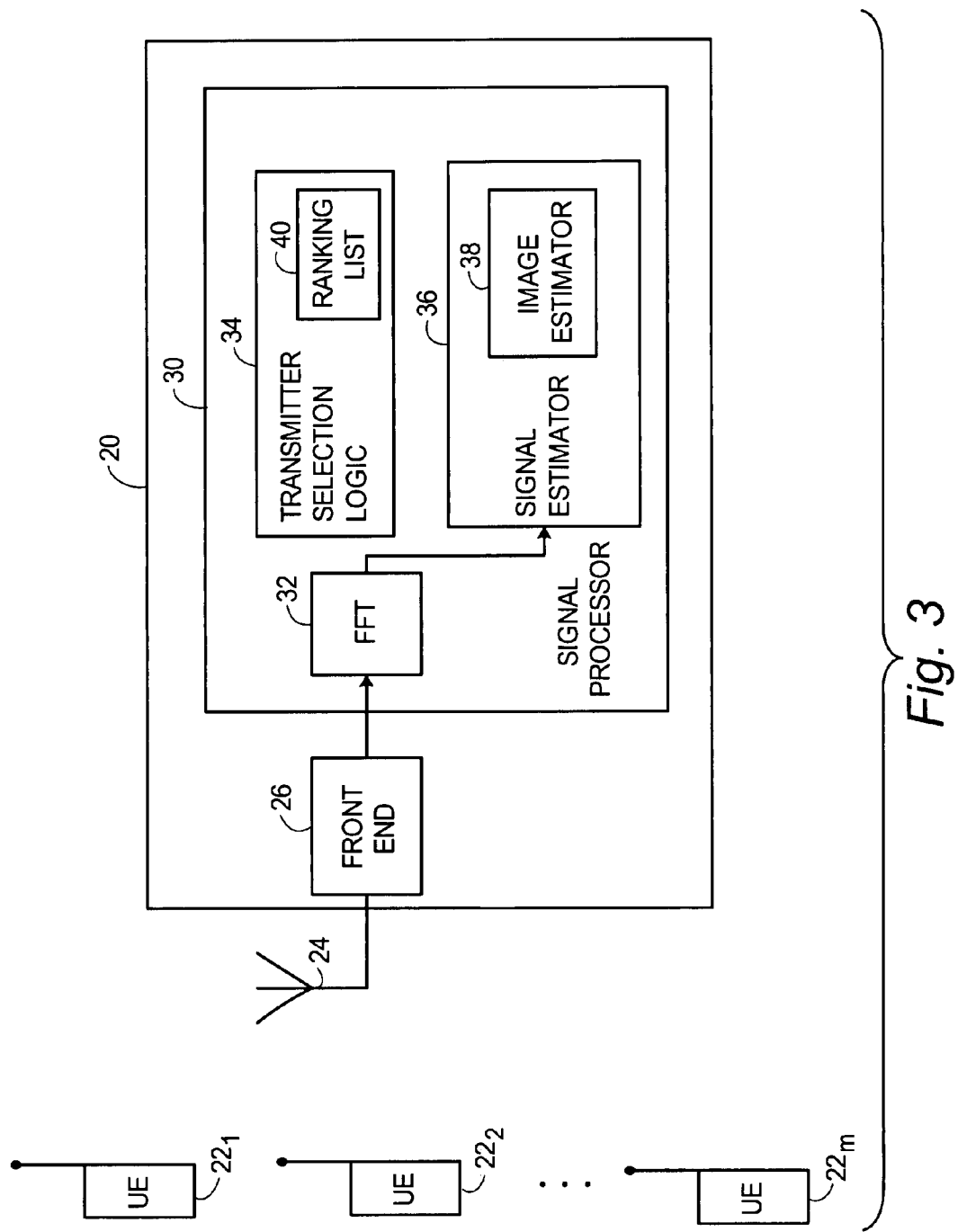
FIG. 3 is a schematic view of an example embodiment of a wireless receiver having image compensation.

FIG. 3 shows an example embodiment of a receiver 20 for use in wireless communications with plural transmitters $22_1$-$22_m$. The receiver 20 comprises one or more antennas 24 which is connected to a receiver front end 26. The receiver front end 26 is in turn connected to a signal processor 30. The antenna(s) 24 facilitate(s) radio communication over an air or radio interface with the plural transmitters $22_1$-$22_m$. Signals received from the plural transmitters $22_1$-$22_m$ are applied to the receiver front end 26. The receiver front end 26 can comprise typical front end components, such as one or more filters (e.g., bandpass filter(s)) and one or more amplifiers, for example. After conditioning by the receiver front end 26, the received signal is applied to signal processor 30.

As further shown in FIG. 3, signal processor 30 comprises a Fast Fourier Transform unit 32; transmitter selection logic 34; signal estimator 36; and image estimator 38. The Fast Fourier Transform unit 32 basically serves to transform the signal from the time domain to the frequency domain, i.e. determines the frequency response of the signal.

As explained subsequently in more detail, transmitter selection logic 34 chooses which of the plural transmitters $22_1$-$22_m$ is to be considered for current signal processing purposes as a first transmitter for transmitting to receiver 30 on a first sub-carrier. In an example explanation described subsequently, the one of the plural transmitters $22_1$-$22_m$ which is currently serving as the first transmitter or "stronger" transmitter is also denoted as transmitter $T_j$.

Figure 2:
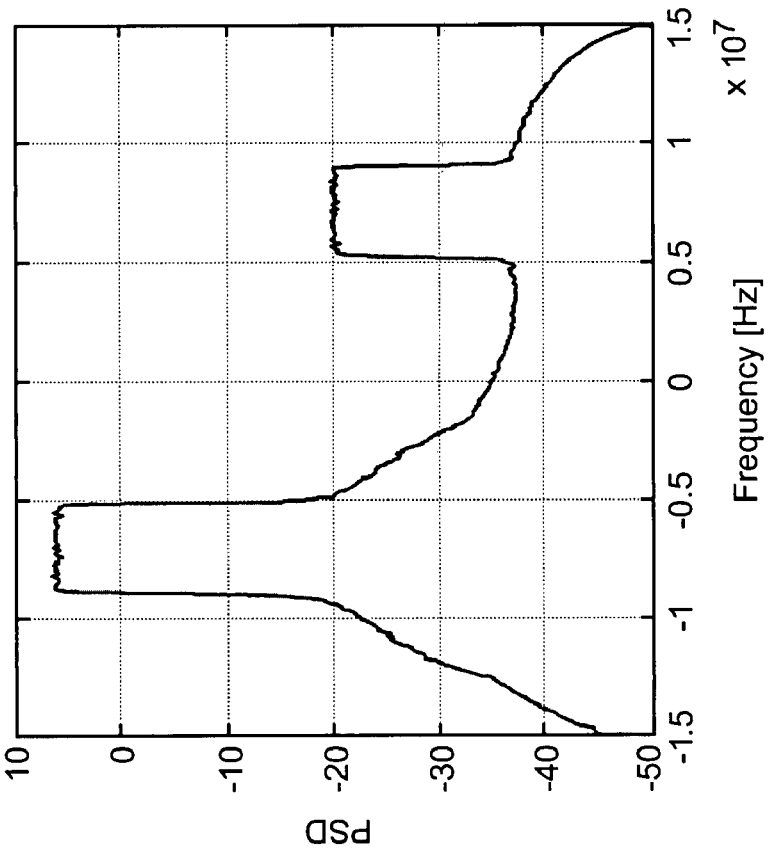
FIG. 2 is a graph showing an example illustration of IQ imbalance when an image signal generated by a first transmitter affects a received signal of another (e.g., weaker) transmitter.
Figure 1:
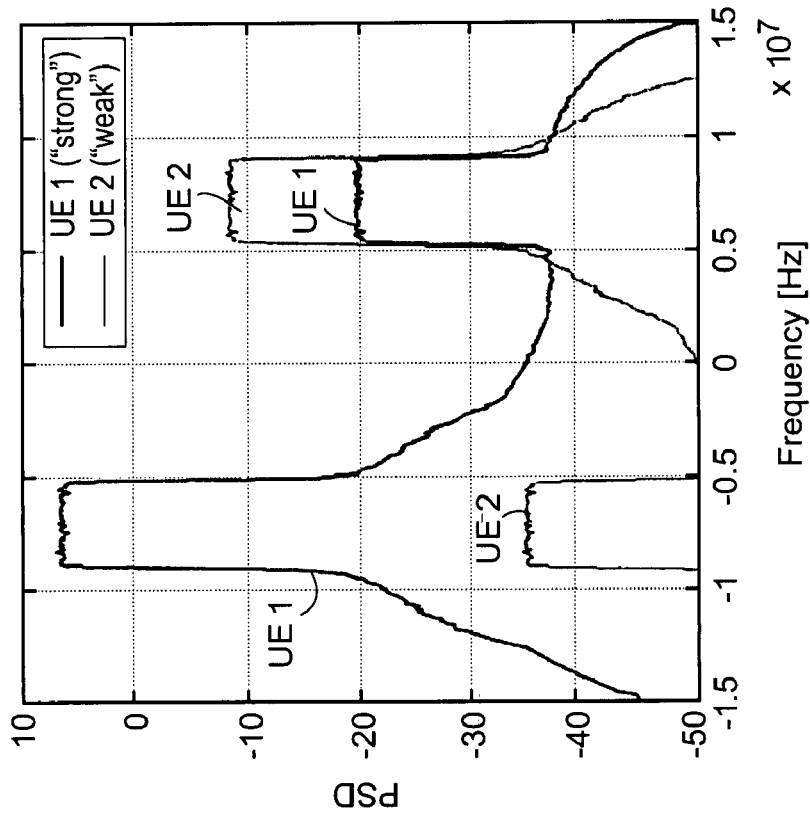
FIG. 1 is a graph showing an example illustration of spectrum emissions in presence of IQ imbalance.

A graph of the signal received at receiver 20 for the first transmitter can be similar to that of transmitter UE 1 in FIG. 2, e.g., having an emitted spectrum occupying frequencies from −9 MHz to −5.4 MHz. A mirror frequency of the first sub-carrier set, if also utilized as sub-carriers, is then considered to be a second sub-carrier set. In the FIG. 2 illustration, the frequencies from 5.4 MHz to 9 MHz are mirror frequencies of the frequencies emitted by the first transmitter. (As used herein, subcarrier "set" encompasses one or more subcarriers; "subcarrier" encompasses a subcarrier set; and "frequency" and "mirror frequency" encompass a spectrum of frequencies [and are not confined to one discrete frequency value]). Thus, in the context of the FIG. 2 example illustration, any one of the plural transmitters $22_1$-$22_m$ which transmits to receiver 20 on any carrier in the second sub-carrier set (e.g., on the spectrum from 5.4 MHz to 9 MHz) can be considered as a second or "weaker" transmitter. The transmitter selecting logic 34 further chooses one or more of the possible ones of the plural transmitters $22_1$-$22_m$ (if transmitting on the second sub-carrier set) is to be selected as a second transmitter or weaker transmitter for current signal processing purposes. In notation subsequently employed, a transmitter serving as the second transmitter for a current instance of the processing of signal estimator 36 is denoted as transmitter $T_k$, and may have a signal received by receiver 20 such as that depicted by UE 2 in FIG. 2.

In the implementation illustrated in FIG. 3, image estimator 38 is included in or comprises signal estimator 36. The image estimator 38 forms an estimate of an image signal occurring on the second sub-carrier set and attributable to a transmission of the first transmitter. Since the size of the image for each individual UE is not known, it has to be estimated. The signal estimator 36 uses the estimate of the image signal and a signal received on the second sub-carrier to, among other things, obtain an estimate of a portion of the signal received on the second sub-carrier which is attributable to the second transmitter. Thus, receiver 30 is able to determine the portion of the signal received on one sub-carrier in the second sub-carrier set which is attributable to the second transmitter in a way that compensates for the image signal from the first transmitter occurring at that specific second sub-carrier.

In an example embodiment, transmitter selection logic 34 is configured to make a ranking of the plural transmitters in order of received signal strength. To this end, FIG. 3 shows transmitter selection logic 34 as including a ranking list 40. Further, in accordance with the ranking determined by transmitter selection logic 34 and stored in ranking list 40, transmitter selection logic 34 chooses which of the plural transmitters is to be considered as the first or stronger transmitter $T_j$ for, e.g., performing a method of signal estimation that compensates for the image signal. After having considered one of the plural transmitters as the first transmitter $T_j$, transmitter selection logic 34 further iteratively chooses (in accordance with the ranking) others of plural transmitters $22_1$-$22_m$ to be the first transmitter, and then to perform the signal estimation method in case any other strong transmitters contribute to or provide an image signal on the second sub-carrier.

Each transmitter, e.g., each UE, camping on a cell is known to the system (e.g., to the radio access network) by/with at least one identification number. This number is unique per cell, and may even be unique globally. Accordingly, the ranking list 40 can associate a transmitter's identification number with received signal strength.

In an example implementation, such as that of 3G LTE, for example, the receiver 20 can be a base station node, also referred to as a RBS or "NodeB" or "B Node", for example. In such implementation, the plural transmitters $22_1$-$22_m$ can be wireless transmitters such as the mobile types of wireless transmitters often referred to as user equipment units (UE). In many instances hereinafter, the appellation "UE" is employed for convenience to refer to a wireless transmitter.

Figure 4:
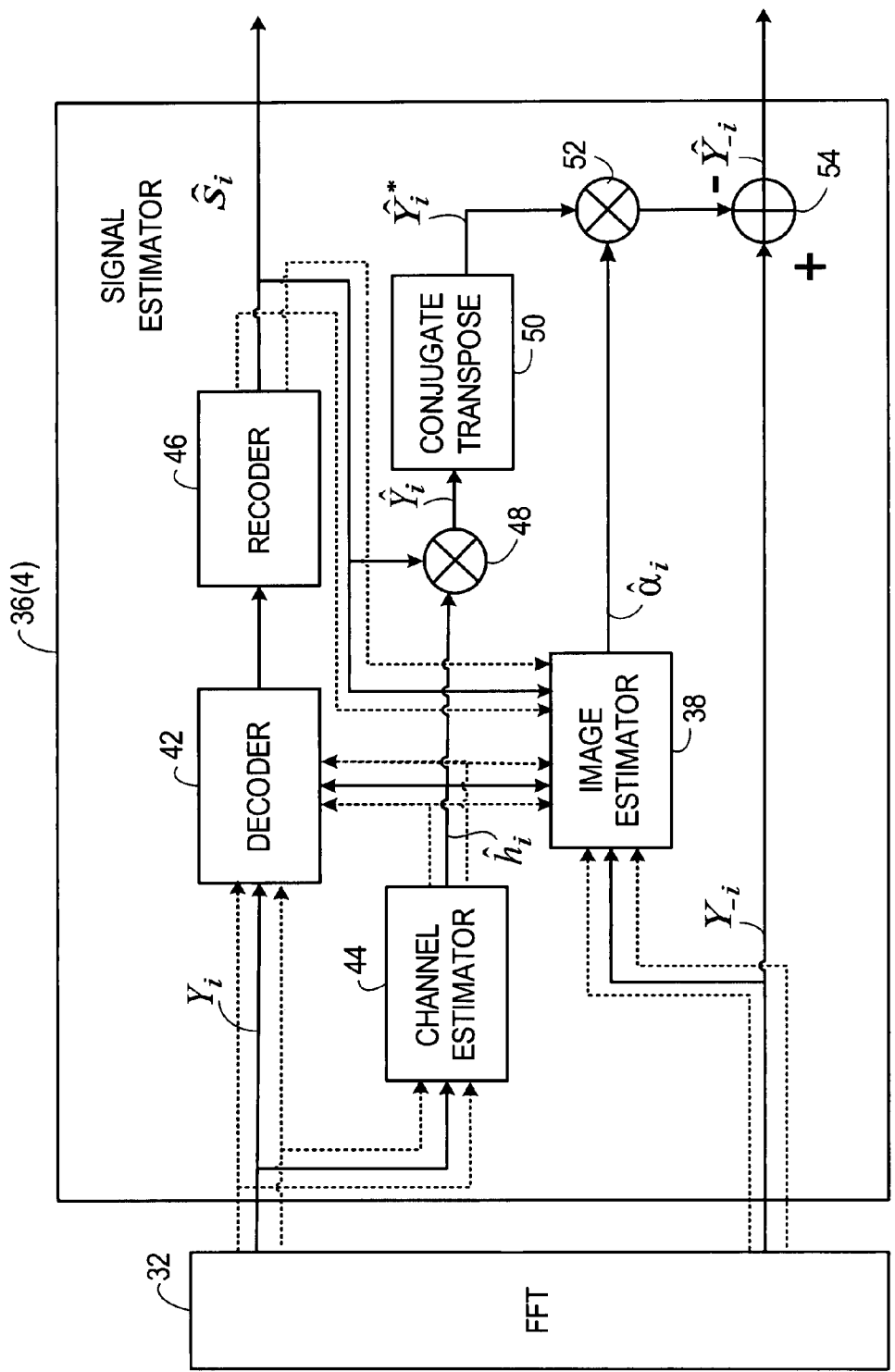
FIG. 4 is a schematic view of a portion of an example embodiment signal estimator shown in conjunction with a Fast Fourier Transform unit.

FIG. 4 illustrates portions of a first example embodiment of a signal estimator 36(4) shown in conjunction with Fast Fourier Transform unit 32. The Fast Fourier Transform unit 32 generates the frequency domain representation of the signal, $Y_i$, and $Y_{-i}$ being the frequency domain representations of the signal at sub-carriers i and −i, respectively. The signal estimator 36(4) comprises both a decoder 42 and a channel estimator 44 which receive the signal $Y_i$ for the first sub-carrier from Fast Fourier Transform unit 32. The received signal on all sub-carriers allocated to the first transmitter is decoded by decoder 42, and subsequently applied to recoder 46. Recoder 46 generates an estimate of the transmitted symbols from the first transmitter, including the symbol $\hat{s}_i$ transmitted on sub-carrier i. The channel estimator 44 generates an estimate $\hat{h}_i$ of the radio channel for the first sub-carrier.

Both the estimate $\hat{s}_i$ of the transmitted symbol and the estimate $\hat{h}_i$ of the radio channel for the first sub-carrier are applied as inputs to image estimator 38 as inputs to multiplier 48. The multiplier 48 multiplies the estimate $\hat{s}_i$ of the transmitted symbol and the estimate $\hat{h}_i$ of the radio channel for the first sub-carrier to generate an estimate $\hat{Y}_i$ of the signal of the first sub-carrier. In a manner subsequently explained, the image estimator 38 uses both the estimate $\hat{s}_i$ of the transmitted symbol and the estimate $\hat{h}_i$ of the radio channel for the first sub-carrier to generate an estimate of the image rejection factor $\hat{a}_i$.

The estimate $\hat{Y}_i$ of the signal of the first sub-carrier as obtained by multiplier 48 is applied to conjugate transposer 50 of signal estimator 36(4), which generates a conjugate transpose $\hat{Y}_i$ of the signal of the first sub-carrier. The conjugate transpose $\hat{Y}_i$ of the signal of the first sub-carrier and the estimate of the image rejection factor $\hat{a}_i$ are applied to respective inputs of multiplier 52. The product of multiplier 52 is the estimate of the mirror component, e.g., the estimate of the image. The estimate of the image is applied to a first input of subtractor 54; the signal $Y_{-i}$ for the second sub-carrier as obtained from Fast Fourier Transform unit 32 is applied to a second input of subtractor 54. Thus, subtractor 54 subtracts the estimate of the image from the signal $Y_{-i}$ for the second sub-carrier to obtain an estimate $\hat{Y}_{-i}$ of the signal for the second sub-carrier. Although not shown in FIG. 4, the estimate $\hat{Y}_{-i}$ of the signal for the second sub-carrier can be used together with estimates of the signal for all sub-carriers allocated to the second transmitter decode the symbols sent from the second transmitter.

In the first example implementation shown in FIG. 4, the image estimator 38 comprises or works with a multiplier such as multiplier 52 to multiply the estimate of the image rejection factor $\hat{a}_i$ by the conjugate transpose $\hat{Y}_i$ of the signal received on the first sub-carrier to form the estimate of the image signal. The conjugate transpose $\hat{Y}_i$ is obtained by conjugate transposer 50 by using the estimate $\hat{Y}_i$ of the signal of the first sub-carrier. In the first example implementation shown in FIG. 4, the estimate $\hat{Y}_i$ of the signal of the first sub-carrier is derived from a re-encoded version of the signal received on the first sub-carrier.

Figure 5:
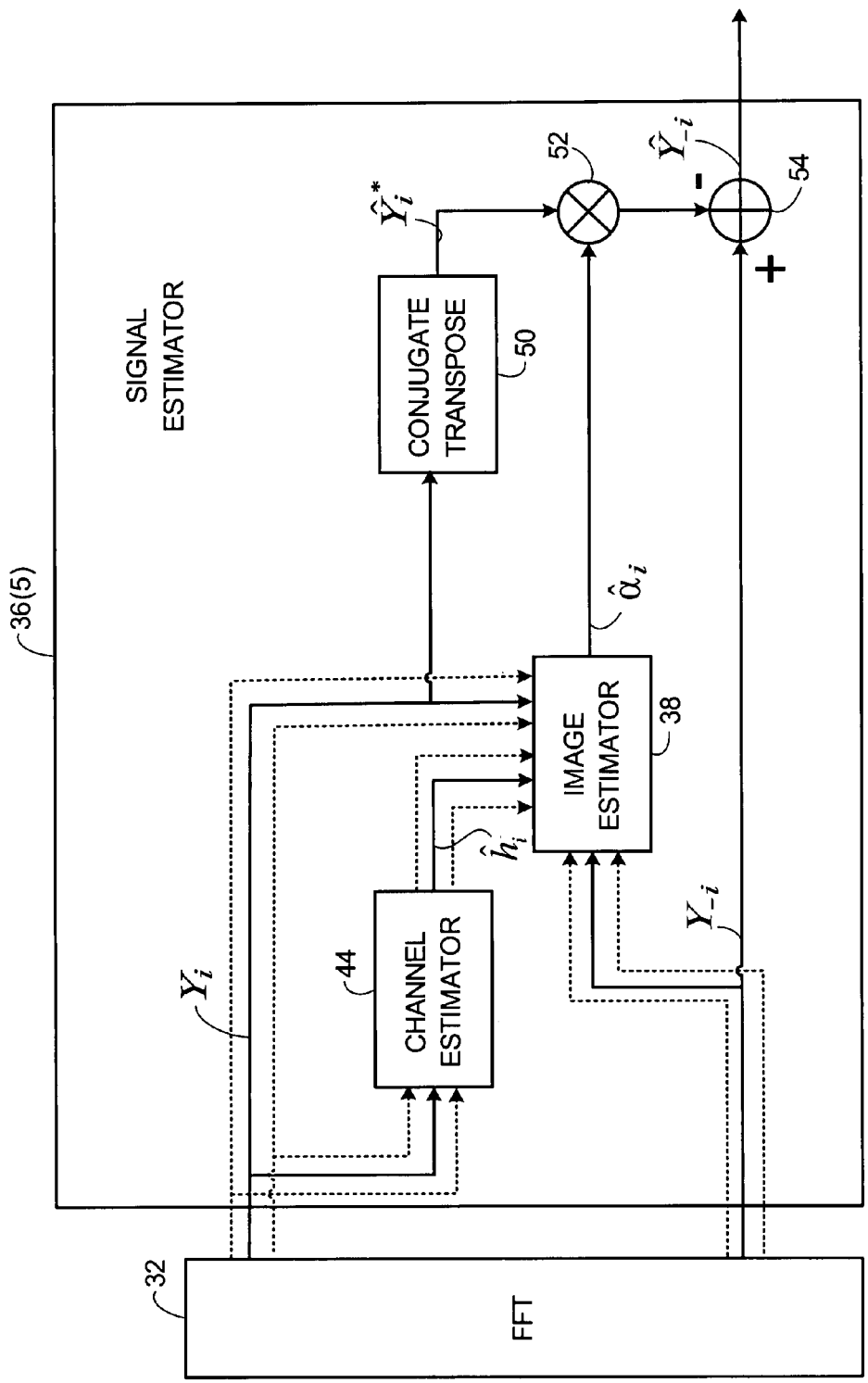
FIG. 5 is a schematic view of a portion of another example embodiment signal estimator shown in conjunction with a Fast Fourier Transform unit.

FIG. 5 illustrates portions of a second example embodiment of a signal estimator 36(5), again shown in conjunction with Fast Fourier Transform unit 32. As in the first example embodiment, Fast Fourier Transform unit 32 generates both a signal $Y_i$ for the first sub-carrier and a signal $Y_{-i}$ for the second sub-carrier. The signal estimator 36(5) comprises a channel estimator 44 which receives the signal $Y_i$ for the first sub-carrier from Fast Fourier Transform unit 32. The channel estimator 44 generates an estimate $\hat{h}_i$ of the radio channel for the first sub-carrier. In the FIG. 5 example embodiment, both the estimate $\hat{h}_i$ of the radio channel for the first sub-carrier and the signal $Y_i$ for the first sub-carrier are applied to image estimator 38. The signal $Y_i$ for the first sub-carrier is applied to conjugate transposer 50, which generates the conjugate transpose $\hat{Y}_i^*$ of the signal received on the first sub-carrier. The image estimator 38 generates the estimate of the image rejection factor $\hat{a}_i$. Multiplier 52 multiplies the estimate of the image rejection factor $\hat{a}_i$ by the conjugate transpose $\hat{Y}_i^*$ of the signal received on the first sub-carrier to form the estimate of the image signal. The subtractor 54 subtracts the estimate of the image is subtracted by subtractor 54 from the signal $Y_{-i}$ for the second sub-carrier to obtain an estimate $\hat{Y}_i$ of the signal on the second sub-carrier received from the second transmitter. Again, although not shown in FIG. 5, the estimate $\hat{Y}_{-i}$ of the signal on the second sub-carrier from the transmitter $T_k$ can be used together with estimates of the signal for all sub-carriers allocated to the transmitter $T_k$ to decode the symbols sent from the transmitter $T_k$.

In an example embodiment, the image estimator 38 is configured to generate the estimate of the image rejection factor $\hat{a}_i$ by evaluating Equation 1. In Equation 1, a and b define a sub-carrier set [a, a+b], $\hat{Y}_i$ is an estimate of the signal received on the first sub-carrier; $\hat{h}_i$ is an estimate of the radio channel for the first sub-carrier; and $Y_{-i}$ is the signal received on the second sub-carrier allocated to transmitter $T_k$.

$$\hat{a}_i = \frac{1}{b+1} \sum_{i=a}^{a+b} \frac{1}{|\hat{h}_i|^2} \hat{Y}_i Y_{-i} \qquad \text{Equation 1}$$

It will be appreciated that the acts or functions of signal processor 30, and thus any one or more of signal estimator 36, transmitter selection logic 34, and image estimator 38, can be performed by one or more "processors" or "controllers". As such, these acts or functions may be provided through the use of hardware capable of executing software in association with appropriate software. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage. When provided by a processor, the functions may be provided by a single dedicated processor, by a single shared processor, or by a plurality of individual processors, some of which may be shared or distributed.

FIG. 6 shows example, representative, basic steps, acts, actions, or events which occur in conjunction with operation of receiver 20. In its basic aspect, the method comprises the example acts of forming an estimate of an image signal occurring on a mirror frequency of a frequency upon which a transmitter $T_j$ operates (act 6-1). The method further includes act 6-2, which comprises subtracting the estimate of the image signal from a received signal of a transmitter $T_k$ operating on the mirror frequency.

FIG. 7 illustrates further acts involved in an example mode of implementing the method of FIG. 6. Act 7-1 comprises ranking the plural transmitters $22_1$-$22_m$ in order of received signal strength. Act 7-2 comprises choosing a transmitter having a strongest received signal strength to be the transmitter $T_j$ and performing the basic acts of the method of FIG. 6 for the chosen transmitter. Act 7-3 comprises choosing a transmitter having a next strongest strength to be the transmitter $T_j$ and performing the basic acts of the method of FIG. 6 for the next chosen transmitter. Act 7-4 comprises performing act 7-3 for each of plural other transmitters.

Figure 8:
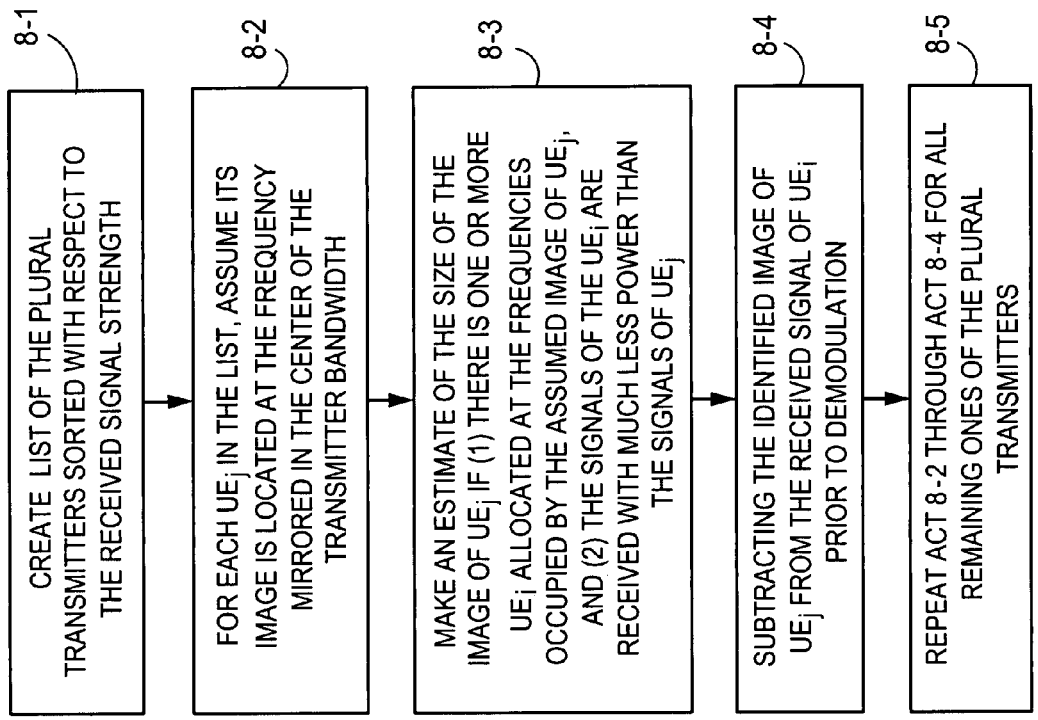
FIG. 8 is a flowchart showing further example acts involved in an example mode of implementing the method of FIG. 6.

Described from another perspective and/or mode, the receiver 20 can perform a method comprising the acts of FIG. 8. As act 8-1, the transmitter selection logic 34 creates a list of the plural transmitters $22_1$-$22_m$, sorted with respect to the received signal strength. As act 8-2, for each UE (denoted as $UE_j$) in the list (e.g., in ranking list 40), it is assumed that its image is located at the frequency mirrored in the center of the transmitter bandwidth (not necessarily the same as the system bandwidth in LTE). If there is a transmitter $T_k$ allocated at the frequencies occupied by the assumed image of $UE_j$ (and preferably if the signals of the transmitter $T_k$ are received with much less power than the signals of $UE_j$), act 8-3 comprises making an estimate of the size of the image of $UE_j$. Act 8-4 comprises subtracting the identified image of $UE_j$ from the received signal of the second transmitter $T_k$ prior to demodulation. Act 8-5 comprises repeating act 8-2 through act 8-4 for all remaining ones of the plural transmitters $22_1$-$22_m$ which operate in the frequencies occupied by the assumed image of transmitter $T_j$.

The bandwidth of a particular transmitter can be known to receiver 20 in any of various ways. For example, the bandwidth can be signaled to the receiver. In some systems, such as 3GPP LTE, it may be mandated that the transmit bandwidth of a transmitter be the same as the system bandwidth, although such is not necessary.

Figure 9:
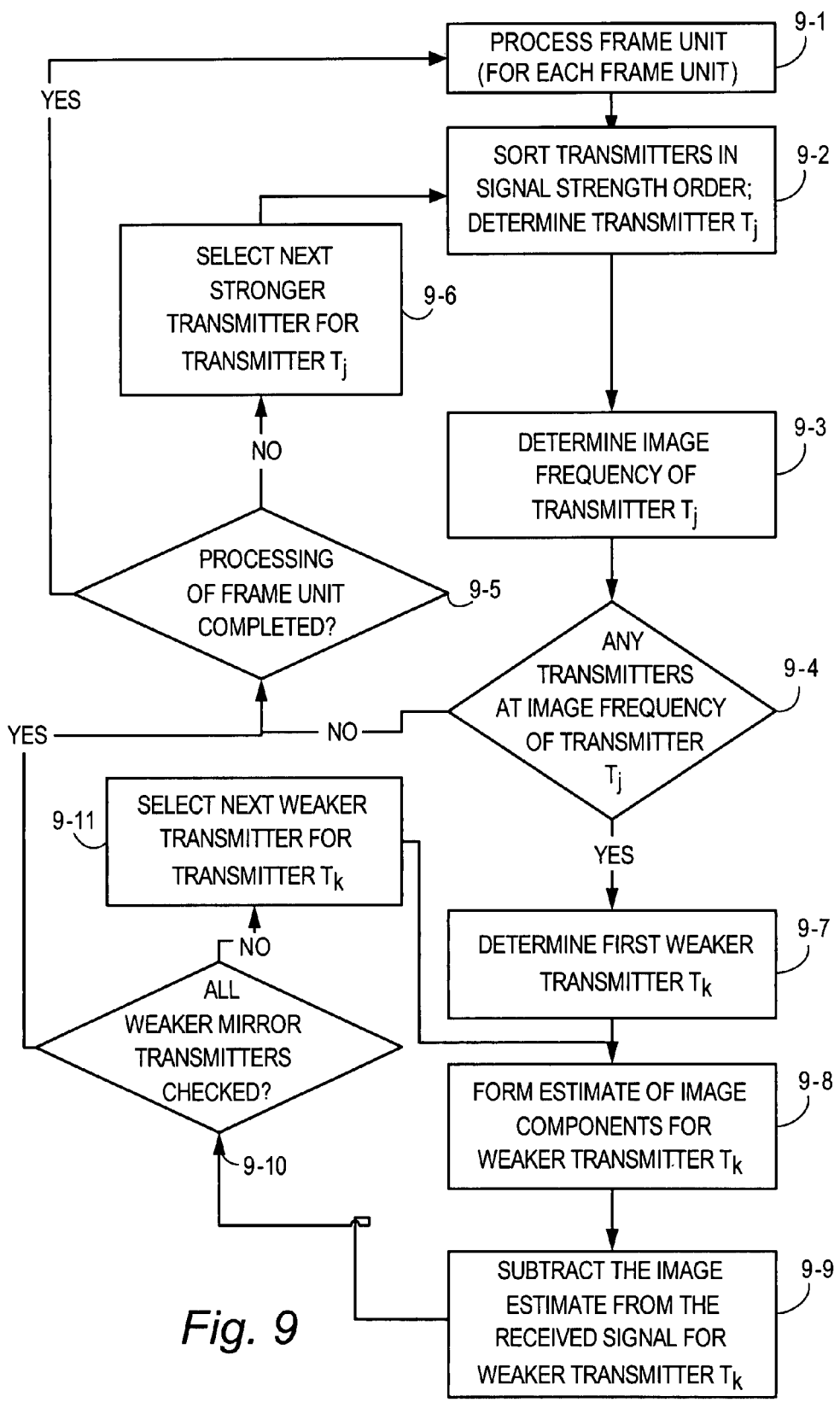
FIG. 9 is a flowchart showing another example implementation of a method of image compensation, and particularly wherein the basic acts of the method are performed for each frame unit received by the receiver.

FIG. 9 shows another example implementation of a method of image compensation. In the FIG. 9 implementation, the basic acts of the method are performed for each frame unit received by the receiver. As used herein, a "frame unit" comprises received signals from each of the plural transmitters.

Act 9-1 of FIG. 9 reflects that the acts of FIG. 9 are performed for each frame unit. The frame unit can be, in the context of 3G LTE, for example, a "subframe"). For 3G LTE, the subframe is a time unit of 1 millisecond, and is divided into fourteen smaller time units (e.g., symbols). For example, act 9-1 can represent receipt of and handling of a complete frame unit, e.g., receipt and down-conversion of one subframe and storing the information of the subframe in a buffer.

Act 9-2 depicts the fact that transmitter selection logic 34 sorts the plural transmitters $22_1$-$22_m$ in signal strength order, where the strongest transmitter (e.g., UE) is labeled $UE_j$. The sorting and maintaining of the list of transmitters $22_1$-$22_m$ in signal strength order is reflected by ranking list 40 managed by transmitter selection logic 34. As part of act 9-2, transmitter selection logic 34 selects the one of the transmitters 22 to be transmitter $T_j$, e.g., the "stronger" transmitter having a signal whose image will be checked for compensation purposes. As seen below, the transmitter selection logic 34 potentially permits each of the m number of transmitters 22 to be sequentially considered as the stronger transmitter. In other words, j can potentially range from 1 to m in the order that the plural transmitters 22 are listed on ranking list 40.

As act 9-3, transmitter selection logic 34 of receiver 20 determines the mirror frequencies (e.g., image frequencies) of transmitter $T_j$, e.g., $UE_j$. For the first time of execution of the acts of FIG. 9 for a particular frame, the first execution of the acts of FIG. 9 will be for the strongest transmitter 22 on ranking list 40. Subsequent executions of act 9-2 will be for other transmitters, e.g., other transmitters may be considered as the "stronger" transmitter $T_j$, the order of consideration being in accordance with the signal strength ranking reflected by ranking list 40.

As act 9-4 transmitter selection logic 34 checks whether there are any signals received at the sub-carrier frequencies corresponding to the mirror frequencies of stronger transmitter $T_j$, e.g., $UE_j$. Any signals received at the sub-carrier frequencies corresponding to the mirror frequencies of $UE_j$ can be considered as candidates for transmitter $T_k$. The sub-carrier frequencies corresponding to the mirror frequencies of UE$_j$ are herein denoted as frequencies −i, and any transmitter operating at the mirror frequencies of UE$_j$ is referred to as UE$_{-i}$. It will thus be understood that, whereas the value of j can range from 1 to m, for each value of j the value of "k" can potentially range from j+1 to m, so long as the transmitter $22_k$ operates in the second sub-carrier frequencies.

In the event that there are no signals received at the sub-carrier frequencies corresponding to the mirror frequencies of UE$_j$, e.g., that no transmitter qualifies for transmitter T$_k$, the transmitter selection logic 34 checks ranking list 40 for the next transmitter in the signal strength order, e.g., for the next "stronger" transmitter to be transmitter T$_j$. Thus, act 9-6 depicts transmitter selection logic 34 selecting a next "stronger" transmitter to be transmitter T$_j$. Such check of ranking list can be tantamount to incrementation of j (e.g., j=j+1). Such selection of a further stronger transmitter T$_j$ is conditioned, however, upon act 9-5. Act 9-5 involves transmitter selection logic 34 first checking to determine whether there is, in fact, a further transmitter T$_j$ to be considered. If, e.g., j=m, and/or if the entire subframe has already been handled, act 9-5 prompts processing of a new frame unit, e.g., a return to act 9-1 for the handling of a new frame unit (e.g., a subframe).

If it is determined as act 9-4 that there are signals received at the sub-carrier frequencies corresponding to the mirror frequencies of UE$_j$, act 9-7 and act 9-8 are performed. Act 9-7 involves transmitter selection logic 34 determining a first "weaker" transmitter (operating at the sub-carrier frequencies corresponding to the mirror frequencies of UE$_j$) to be the second or weaker transmitter T$_k$. Act 9-8 comprises image estimator 38 determining an estimate of the image components for transmitter T$_k$. The determination of an estimate of the image components for transmitter T$_k$ corresponds, e.g., to act 6-1 of FIG. 6. Act 9-9 comprises subtracting the image estimate from the received signal on the second sub-carrier frequencies.

Act 9-10 comprises checking whether all "weaker" transmitters on ranking list 40 which operate in the sub-carrier frequencies corresponding to the mirror frequencies of UE$_j$ have undergone image compensation. If so, processing can continue, e.g., with act 9-5. Otherwise, as act 9-11 the transmitter selection logic 34 selects another transmitter (operating in the sub-carrier frequencies corresponding to the mirror frequencies of UE$_j$) to be the weaker transmitter T$_k$, for further repetitions of act 9-8 and act 9-9.

What now follows is a description of a technique or method for estimating the image component due to IQ imbalance. In other words, the image estimator 38 can be configured with logic to reflect or implement the following.

Assume the numbering of the sub-carriers is −n, −n+1 ..., 0, 1, ..., n−1, n, i.e. the sub-carriers on the negative frequencies (with respect to the baseband signal) has negative indices and positive frequencies have positive indices. In that case the received signal for the i:th sub-carrier Y$_i$ can be written as shown in Equation 2.

$$Y_i = h_i s_i + e_i + a_{-i} h_{-i}^* s_{-i}^*$$  Equation 2

In Equation 2, h$_i$ is the radio channel, including the transmitter gain in the UE, s$_i$ the transmitted symbol (normalized to have unit average power) and e$_i$ the noise. Furthermore, h$_{-i}^*$ s$_{-i}^*$ is the complex conjugate of the received signal from the UE transmitting at sub-carrier −i, i.e. the mirror component due to IQ imbalance. The IQ suppression factor is a$_{-i}$ and is unknown for the receiver, but is typically in the order of −20 dB or below.

The receiver 20 then starts to decode the strongest UE. Assume for now that the strongest UE is transmitting on sub-carrier i∈[a, a+b], a,b>0. Hence |h$_i$|>|h$_{-i}$|. Then, since a$_{-i}$<<1, the last term in Equation 2 can be neglected and thus the channel h$_i$ can be estimated according to prior art techniques not limited in the invention. Then also s$_i$ can be detected. Hence the receiver obtains an estimate reflected by Equation 3.

$$\hat{Y}_i = \hat{h}_i \hat{s}_i$$  Equation 3

After that, the receiver sequentially tries to decode the signals from the weaker UE, eventually the one(s) transmitting on sub-carrier −i, i.e. the mirror sub-carriers to i ∈[a, a+b]. The equations for these carriers can be written according to Equation 4.

$$Y_{-i} = h_{-i} s_{-i} + e_{-i} + a_i h_i^* s_i^*$$  Equation 4

The last term in Equation 4 cannot be neglected, since differences in transmit power and path loss can make |h$_i$|>>|h$_{-i}$|. Since a$_i$ is typically in the range of −20 dB or less, the image from the stronger UE starts to become more and more significant as the difference in received power increases.

In order to compensate for the image of the strong UE when demodulating the signal from a much weaker UE, an estimate of a$_i$ is formed. By multiplying the received signal Y$_{-i}$ with $\hat{Y}_i$ and taking expectation, Equation 5 results.

$$E[\hat{Y}_i Y_{-i}] E[\hat{h}_i \hat{s}_i (h_{-i} s_{-i} + e_{-i} + a_i h_i^* s_i^*)] \approx |h_i|^2 a_i$$  Equation 5

In Equation 5 the transmitted symbols are normalized to unit power. A reasonable assumption is that a$_i$ is fairly constant over frequency. Thus an estimate of a$_i$ can now be formed by averaging over the sub-carrier set [a, a+b], as shown by Equation 6.

$$\hat{a}_i = \frac{1}{b+1} \sum_{i=a}^{a+b} \frac{1}{|\hat{h}_i|^2} \hat{Y}_i Y_{-i} \approx a_i + \varepsilon_i.$$  Equation 6

In Equation 6, ε$_i$ is the estimation error. Since a$_i$ can be assumed fairly constant over time, the variance of the estimation error can be further reduced by averaging also over several symbols.

Now there is an estimate of the mirror component, the estimate of the mirror component can be subtracted from sub-carrier set −i to obtain Equation 7.

$$\hat{Y}_i = Y_{-i} - \hat{a}_i \hat{Y}_i^* \approx h_{-i} s_{-i} + e_{-i}.$$  Equation 7

Further, the channel can be estimated and the symbol at sub-carrier −i can be detected using prior art techniques.

It has been assumed above that the UE transmitter bandwidths equal the system bandwidth, i.e. that the interference caused by IQ imbalance is mirrored in the center frequency of the band. However, it is possible, e.g. in an earlier proposal for the 3G LTE system, that the UE transmitter bandwidth may be smaller than the system bandwidth. More specifically, a 10 MHz UE can operate in a 20 MHz system. This implies that, in a 20 MHz system with N$_c$ sub-carriers, the reception of the signal from one (weak) UE at frequency −i may experience interference both from a 20 MHz UE at frequency i, and a 10 MHz UE at frequency i−N$_c$/2. The estimation and removal of the image component from frequency i−N$_c$/2 is analogous to Equations 5-7. In such a system, the receiver needs to be aware of bandwidth for all UEs, and thus knows where the most likely image positions are located.

Figure 10:
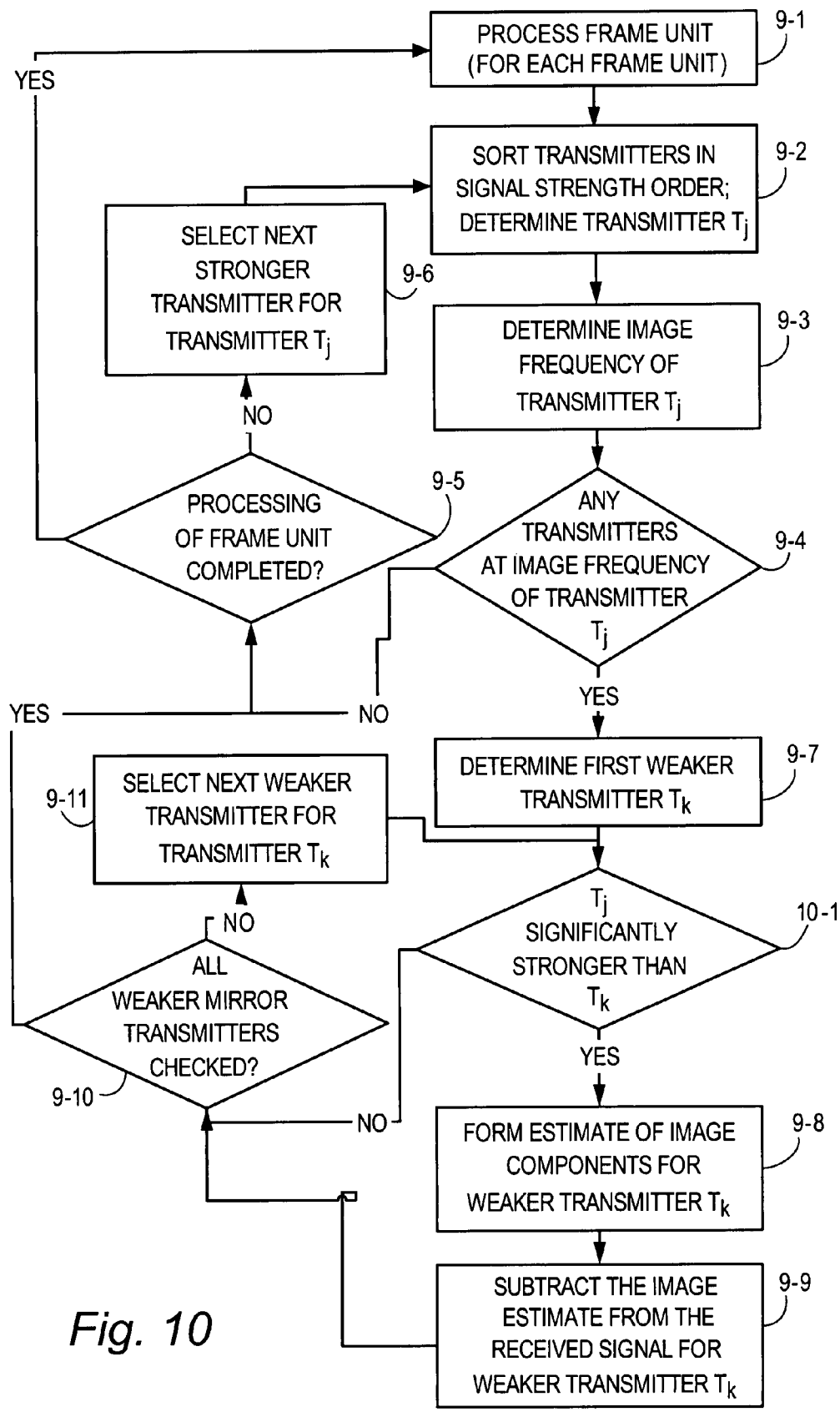
FIG. 10 is a flowchart showing another example implementation of a method of image compensation, and particularly a variation of the method of FIG. 9.

FIG. 10 shows another example implementation of a method of image compensation. The acts of FIG. 10 which resemble or analogous to those of FIG. 9 bear same act numbers. The example implementation of FIG. 10 primarily differs from that of FIG. 9 by inclusion of act 10-1. Act 10-1 involves determining whether received signal strength of the transmitter T exceeds the received signal strength of the transmitter $T_k$ by a predetermined amount. For example, the predetermined amount can be about 10 dB, depending on design parameters. If the determination of act 10-1 is negative, i.e., the received signal strength of the transmitter $T_j$ does not exceed the received signal strength of the transmitter $T_k$ by a predetermined amount, act 9-8 and act 9-9 are not performed.

In terms of implementations such as those above described for FIG. 9 and FIG. 10, it should be understood that processing the transmitters on a per frame unit basis is not mandatory, and that the other acts of the implementations can be utilized without regarding to time or frame unit.

Figure 11:
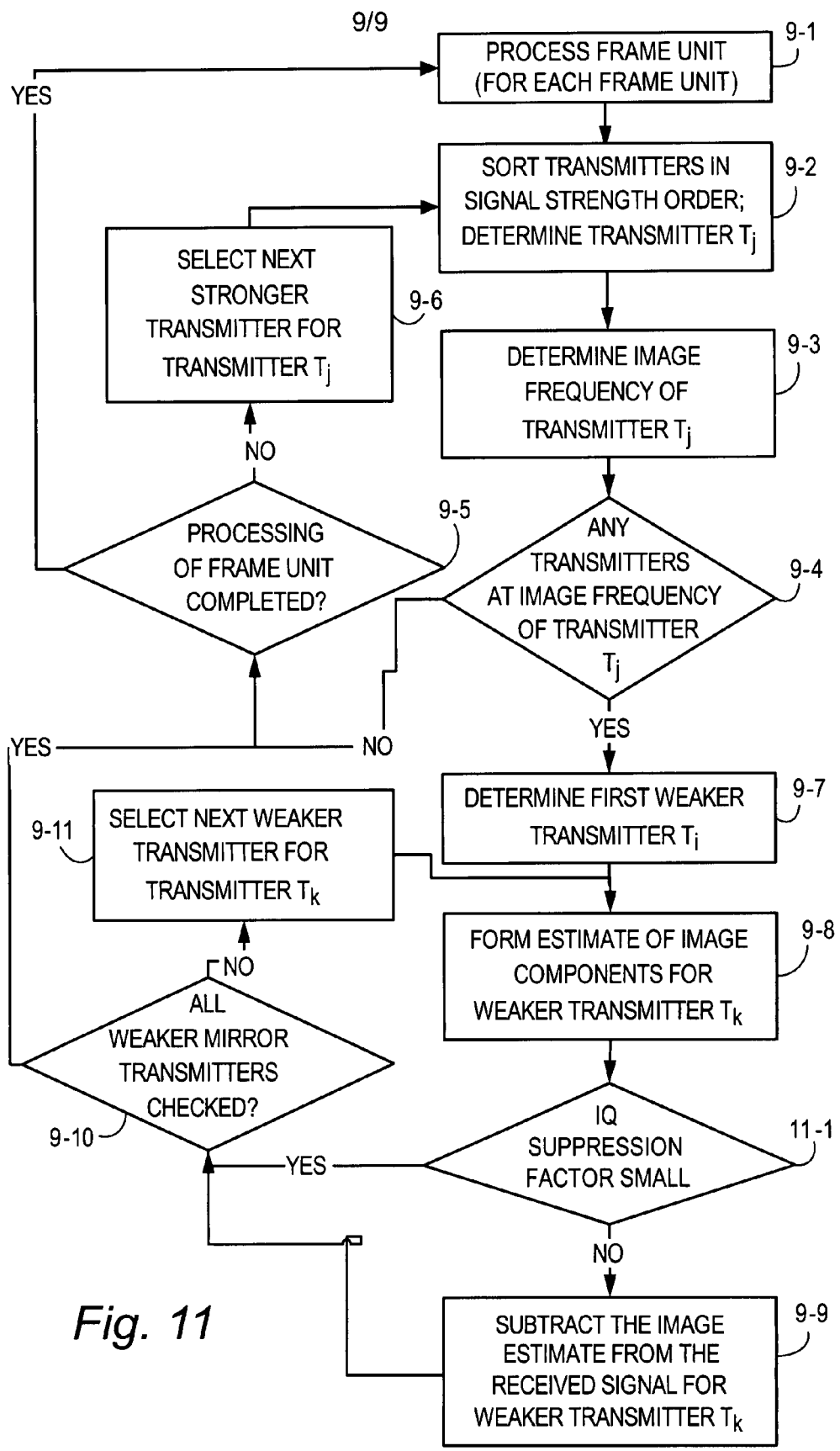
FIG. 11 is a flowchart showing yet another example implementation of a method of image compensation, and particularly another variation of the method of FIG. 9.

FIG. 11 shows yet another example implementation of a method of image compensation. The acts of FIG. 11 which resemble or analogous to those of FIG. 9 bear same act numbers. The example implementation of FIG. 11 primarily differs from that of FIG. 9 by inclusion of act 11-1. Act 11-1 involves determining if the estimated image rejection factor $\hat{a}_i$ is small. If the check at act 11-1 determines that the estimated image rejection factor $\hat{a}_i$ is indeed small, the subtraction of act 9-9 is not performed. The example embodiment of FIG. 11 may be advantageous in certain situations. For example, the description above has, at various points, assumed that a fixed local oscillator has been used at the center of the transmitter bandwidth. If this is not the case, e.g. when the local oscillator is always changed to appear at the center of the desired transmitted spectrum, there will be no signal transmitted at the assumed image frequency. Implementation of the technology described herein will not be harmful in such case, since the estimated $a_i$ would then become small. Therefore, as act 11-1, the embodiment of FIG. 11 implements a check to determine if the estimated $a_i$ is sufficiently small so that the correction of Equation 7 should not be performed. In an example implementation, whether the estimated $a_i$ is sufficiently small to avoid the subtraction of act 9-9 comprises establishing thresholds $\epsilon_1$ and $\epsilon_2$, such that if $|a_i| < \epsilon_1$, or if $|\hat{a}_i \hat{h}| < \epsilon_2 |h_{-i}|$, the correction in Equation 7 is not performed.

The use of $\hat{Y}_i$ in Equation 5-Equation 7 and the embodiment of FIG. 4 involves $\hat{s}_i$, which is formed by re-encoding the received message that contains the signal sent on carrier i. Thus there is a risk of error propagation, should this message not be correctly decoded. There is also some complexity associated with this re-encoding. An alternative is to instead use the received signal $Y_i$ directly, in the manner shown in the example embodiment of FIG. 5. This is less complex, and is not subject to error propagation, but the estimation variance is higher. For any given implementation which is the preferred solution depends, e.g. on the risk for error propagation, which in turn depends on, e.g., the code rate used. This is typically known to the receiver, and thus the receiver may determine the best method dynamically. One possibility is to try to decode the signal from the strong UE and, if the cyclical redundancy code (CRC) checks, to use the formulation in Equation 5-Equation 7. Otherwise, $\hat{Y}_i$ is replaced with $Y_i$ in the calculations for Equation 5-Equation 7.

An alternative to the successive interference cancellation approach described above is to do joint demodulation of the signals from all UEs. One advantage of this is that the ordering of UEs with respect to signal strength is not necessary, at the cost of higher complexity (and possibly larger estimation errors).

Thus, as described above, in at least some of its aspects the technology includes a receiver apparatus and method of operating same. The radio receiver is able to simultaneously receive the signal from several radio transmitter units operating in a FDMA system. Further, the receiver is capable or configured to perform the following example actions:

Ordering or ranking the transmitter units with respect to the received signal strength from each unit, Demodulating the signals from the transmitter units sequentially, starting with the strongest one. ending with the weakest one.

Estimating the amplitude and phase of the image signal transmitted on the assumed mirror frequencies of each transmitter unit.

Subtracting the estimated image signal of significantly stronger transmitter units when demodulating the signal from significantly weaker transmitter units.

The estimation of the amplitude and phase of the image signal of a transmitter unit received with high power can be formed by correlating the signal received at the assumed image frequencies with the signal received from the strong transmitter unit.

Alternatively, the estimation of the amplitude and phase of the image signal of a transmitter unit received with high power can be formed by correlating the signal received at the assumed image frequencies with a signal constructed by re-encoding the transmitted message from the strong transmitter unit.

The receiver can, in some example implementations, operate in a FDMA system, such as an OFDMA system. Moreover, in some example implementations, the receiver can operate in a SC-FDMA system, such as (by way of non-limiting example) the uplink in the 3G LTE system.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A computer-implemented method of operating a receiver which receives radio frequency signals from plural transmitters, the method comprising:

using the computer to form an estimate of an image signal occurring on a mirror frequency of a frequency upon which a transmitter $T_j$ operates;

using the computer to subtract the estimate of the image signal from a received signal of a transmitter $T_k$ operating on the mirror frequency.

2. The method of claim 1, further comprising:
(1) ranking the plural transmitters in order of received signal strength;
(2) choosing a transmitter having a strongest received signal strength to be the transmitter $T_j$ and performing the acts of claim 1;
(3) choosing a transmitter having a next strongest strength to be the transmitter $T_j$ and performing the acts of claim 1;
(4) performing act (3) for each of plural other transmitters.

3. The method of claim 1, further comprising performing the acts of claim 1 for the transmitter $T_j$ only if the received signal strength of the transmitter $T_j$ exceeds the received signal strength of the transmitter $T_k$ by a predetermined amount.

4. The method of claim 3, wherein the predetermined amount is about 10 dB.

5. The method of claim 1, further comprising performing the acts of claim 1 for each frame unit received by the receiver, the frame unit comprising received signals from each of the plural transmitters.

6. The method of claim 1, further comprising:
ranking the plural transmitters in order of received signal strength; and,
demodulating signals received from the plural transmitters in order of the received signal strength.

7. The method of claim 1, further comprising forming the estimate of the image signal occurring on the mirror frequency by evaluating the expression $\hat{a}_i \hat{Y}_i^*$, wherein wherein $\hat{Y}_i^*$ is a conjugate transpose of either (1) the signal received on the first sub-carrier or (2) an estimate of the signal received on the first sub-carrier, and wherein $\hat{a}_i$ is obtained by evaluating $$\hat{a}_i = \frac{1}{b+1} \sum_{i=a}^{a+b} \frac{1}{|\hat{h}_i|^2} \hat{Y}_i Y_{-i}$$

wherein a and b define a sub-carrier set [a, a+b] transmitted from the transmitter $T_j$;
wherein $\hat{Y}_i$ is either (1) the signal received on the first sub-carrier or (2) the estimate of the signal received on the first sub-carrier;
wherein $\hat{h}_i$ is an estimate of the radio channel for the first sub-carrier; and
wherein $Y_{-i}$ is the signal received on the second sub-carrier.

8. The method of claim 7, further comprising determining whether the estimated image rejection factor $\hat{a}_i$ is sufficiently small so that the estimate of the image signal is not to be subtracted from the received signal of the transmitter $T_k$ operating on the mirror frequency.

9. A receiver for use in wireless communications with plural transmitters, the receiver comprising:
transmitter selection logic configured to choose which of the plural transmitters is to be considered as a first transmitter for transmitting to the receiver on a first sub-carrier, a mirror frequency of the first sub-carrier being a second sub-carrier, a selected one of the plural transmitters which transmits to the receiver on the second sub-carrier being considered a second transmitter;
an image estimator configured to form an estimate of an image signal occurring on the second sub-carrier and attributable to a transmission of the first transmitter;
a signal estimator configured to use the estimate of the image signal and a signal received on the second sub-carrier to obtain an estimate of a portion of the signal received on the second sub-carrier which is attributable to the second transmitter.

10. The apparatus of claim 9, wherein the transmitter selection logic is configured to make a ranking of the plural transmitters in order of received signal strength and in accordance with the ranking to choose which of the plural transmitters is to be considered as the first transmitter.

11. The apparatus of claim 10, wherein the transmitter selection logic is further configured to iteratively choose in accordance with the ranking others of the plural transmitters to be the first transmitter.

12. The apparatus of claim 9, wherein the image estimator comprises a multiplier configured to multiply an estimate of an image rejection factor by a conjugate transpose of either (1) a signal received on the first sub-carrier or (2) an estimate of the signal received on the first sub-carrier to form the estimate of the image signal.

13. The apparatus of claim 12, wherein the image estimator is configured to dynamically select between using either (1) a signal received on the first sub-carrier or (2) an estimate of the signal received on the first sub-carrier for forming the estimate of the image signal.

14. The apparatus of claim 12, wherein the multiplier comprising the image estimator is configured to multiply the estimate of the image, rejection factor by a conjugate transpose of an estimate of the signal received on the first sub-carrier to form the estimate of the image signal, the estimate of the signal received on the first sub-carrier being derived from a re-encoded version of the signal received on the first sub-carrier.

15. The apparatus of claim 12, wherein the image estimator is configured to generate the estimate of the image rejection factor $\hat{a}_i$ by evaluating $$\hat{a}_i = \frac{1}{b+1} \sum_{i=a}^{a+b} \frac{1}{|\hat{h}_i|^2} \hat{Y}_i Y_{-i}$$

wherein a and b define a sub-carrier set [a, a+b];
wherein $\hat{Y}_i$ is either (1) the signal received on the first sub-carrier or (2) an estimate of the signal received on the first sub-carrier;
wherein $\hat{h}_i$ is an estimate of the radio channel for the first sub-carrier; and
wherein $\hat{Y}_{-i}$ is the signal received on the second sub-carrier.

16. The apparatus of claim 9, wherein the signal estimator is configured to determine whether the estimated image rejection factor $\hat{a}_i$ is sufficiently small so that the estimate of the image signal is not to be subtracted from the signal received on the second sub-carrier.

17. The apparatus of claim 9, wherein the signal estimator is configured to subtract the estimate of the image signal from the signal received on the second sub-carrier to obtain the estimate of the portion of the signal received on the second sub-carrier which is attributable to the second transmitter.

18. A receiver which receives radio frequency signals from plural transmitters, the receiver comprising:
means for forming an estimate of an image signal occurring on a mirror frequency of a frequency upon which a transmitter $T_j$ operates;
means for subtracting the estimate of the image signal from a received signal of a transmitter $T_k$ operating on the mirror frequency.

19. The apparatus of claim 18, further comprising:
means for ranking the plural transmitters in order of received signal strength;
means for choosing a transmitter having a strongest received signal strength to be the transmitter $T_j$.

20. The apparatus of claim 18, wherein the means for forming the estimate of the image signal occurring on the mirror frequency is configured to evaluate the expression $\hat{a}_i \hat{Y}_i^*$, wherein wherein $\hat{Y}_i^*$ is a conjugate transpose of either (1) the signal received on the first sub-carrier or (2) an estimate of the signal received on the first sub-carrier, and wherein $\hat{a}_i$ is obtained by evaluating $$\hat{a}_i = \frac{1}{b+1} \sum_{i=a}^{a+b} \frac{1}{|\hat{h}_i|^2} \hat{Y}_i Y_{-i}$$

wherein a and b define a sub-carrier set [a, a+b];

wherein $\hat{Y}_i$ is either (1) the signal received on the first sub-carrier or (2) an estimate of the signal received on the first sub-carrier;

wherein $\hat{h}_i$ is an estimate of the radio channel for the first sub-carrier; and wherein $\hat{Y}_{-i}$ is the signal received on the second sub-carrier.

* * * * *